United States Patent
Berodier et al.

(10) Patent No.: US 11,230,495 B2
(45) Date of Patent: Jan. 25, 2022

(54) AGENTS FOR ENHANCING CEMENT STRENGTH

(71) Applicant: GCP Applied Technologies Inc., Cambridge, MA (US)

(72) Inventors: Elise Berodier, Cambridge, MA (US); Josephine H. Cheung, Lexington, MA (US); Leslie J. Buzzell, Burlington, MA (US)

(*) Notice: Subject to any disclaimer, the term of this patent is extended or adjusted under 35 U.S.C. 154(b) by 834 days.

(21) Appl. No.: 15/961,555

(22) Filed: Apr. 24, 2018

(65) Prior Publication Data
US 2018/0312435 A1    Nov. 1, 2018

Related U.S. Application Data

(60) Provisional application No. 62/489,798, filed on Apr. 25, 2017.

(51) Int. Cl.
*C04B 14/00* (2006.01)
*C04B 28/04* (2006.01)
(Continued)

(52) U.S. Cl.
CPC ......... *C04B 16/0675* (2013.01); *C04B 7/02* (2013.01); *C04B 24/122* (2013.01); *C04B 28/04* (2013.01);
(Continued)

(58) Field of Classification Search
CPC .. C04B 7/00; C04B 7/34; C04B 32/00; C04B 9/12; C04B 28/04; C04B 28/00; C04B 14/00
(Continued)

(56) References Cited

U.S. PATENT DOCUMENTS

| 3,872,212 A | 3/1975 | Atwood et al. |
| 4,473,405 A * | 9/1984 | Gerber ............... C04B 28/02 |
| | | 106/725 |

(Continued)

FOREIGN PATENT DOCUMENTS

| EP | 2594540 A1 | 5/2013 |
| EP | 2746237 A1 | 6/2014 |

(Continued)

OTHER PUBLICATIONS

Gebhardt, "Survey of North American Portland Cements: 1994", Cement, Concrete & Aggregates, vol. 17, No. 2, 1995, pp. 145-189.
(Continued)

*Primary Examiner* — James E McDonough
(74) *Attorney, Agent, or Firm* — Craig K. Leon

(57) ABSTRACT

A method of forming a cement composition. The method comprises adding to a hydraulic cementitious material a first strength-enhancing agent and a second strength-enhancing agent, wherein the content of total alkali ($Na_2O$ equivalent) in the hydraulic cementitious material is less than or equal to 0.7% by weight of the cementitious material. The first strength-enhancing agent includes a compound represented by structural formula (I):

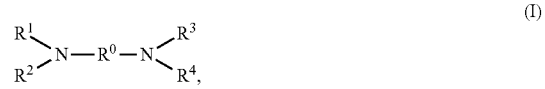

and
the second strength-enhancing agent is sodium sulfate, potassium sulfate, or a mixture thereof. The example values of the variables in structural formula (I) and the example
(Continued)

amounts of the first and second strength-enhancing agents being added are defined herein.

27 Claims, 11 Drawing Sheets

(51) Int. Cl.
*C04B 16/06* (2006.01)
*C04B 7/02* (2006.01)
*C08K 5/17* (2006.01)
*C08K 5/00* (2006.01)
*C08K 3/34* (2006.01)
*C04B 24/12* (2006.01)
*C04B 40/00* (2006.01)
*C04B 7/00* (2006.01)
*C04B 28/00* (2006.01)
*C04B 9/12* (2006.01)
*C04B 32/00* (2006.01)
*C04B 7/34* (2006.01)
*C08L 79/02* (2006.01)
*C04B 111/10* (2006.01)

(52) U.S. Cl.
CPC ...... *C04B 40/0039* (2013.01); *C04B 40/0042* (2013.01); *C08K 3/346* (2013.01); *C08K 5/0025* (2013.01); *C08K 5/17* (2013.01); C04B 2111/1025 (2013.01); C04B 2235/349 (2013.01); C08L 79/02 (2013.01)

(58) Field of Classification Search
USPC .......................... 106/638, 713, 736
See application file for complete search history.

(56) References Cited

U.S. PATENT DOCUMENTS

| 5,084,103 | A | 1/1992 | Myers et al. |
| 5,211,751 | A | 5/1993 | Arfaei et al. |
| 7,610,384 | B1 | 10/2009 | Schulzrinne et al. |
| 9,023,151 | B2 * | 5/2015 | Pellerin ................. C04B 22/062 106/727 |
| 2006/0086291 | A1 | 4/2006 | Jardine |
| 2009/0249975 | A1 * | 10/2009 | Herschke ............ C04B 40/0039 106/7 |
| 2011/0269875 | A1 * | 11/2011 | Nicoleau ................ C04B 28/02 524/2 |
| 2013/0298805 | A1 | 11/2013 | Schwartzentruber et al. |
| 2014/0150694 | A1 | 6/2014 | Marazzani et al. |

FOREIGN PATENT DOCUMENTS

| EP | 3109216 | 12/2016 |
| FR | 2485040 A1 | 12/1981 |
| WO | WO-9715535 A1 | 5/1997 |
| WO | WO-2011/134025 A1 | 11/2011 |
| WO | WO-2015/042031 A1 | 3/2015 |
| WO | 2013117586 | 5/2015 |

OTHER PUBLICATIONS

Communication Pursuant to Rule 114(2) EPC in European Application No. 18726872.7, dated Nov. 7, 2019, 10 pages.

* cited by examiner

AGENTS FOR ENHANCING CEMENT STRENGTH

RELATED APPLICATION

This application claims the benefit of U.S. Provisional Application No. 62/489,798, filed on Apr. 25, 2017. The entire teachings of the above application(s) are incorporated herein by reference.

BACKGROUND OF THE INVENTION

Cements often exhibit low compressive strength in the early stages of setting (i.e. compressive strength after 1 to 3 days after mixing with water). One solution used in the cement industry to enhance early compressive strength is to add alkali metals in a water-soluble form (e.g., alkali metal salts). However, the drawback of this solution is a decrease in a long-term (late) compressive strength, usually measured 28 days after mixing. It is thus desirable to develop cement additives to increase early compressive strength of cement compositions without negatively affecting late compressive strength.

SUMMARY OF THE INVENTION

It has now been discovered that combinations of an alkali metal salt and certain alkanoldiamines act as potent strength enhancers of hydraulic cementitious materials, improving both early and late compressive strengths.

In a first example embodiment, the present invention is a method of forming a cement composition. The method comprises adding to a hydraulic cementitious material a first strength-enhancing agent and a second strength-enhancing agent, wherein the content of total alkali ($Na_2O$ equivalent) in the hydraulic cementitious material is less than or equal to 0.7% by weight of the cementitious material. The first strength-enhancing agent includes a compound represented by structural formula (I):

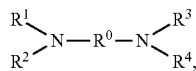

(I)

wherein each $R^1$, $R^2$, $R^3$, and $R^4$, independently is a $—(C_1$-$C_4)$alkyl-OH, and $R^0$ is a $(C_1$-$C_4)$ alkylene. The second strength-enhancing agent is sodium sulfate, potassium sulfate, or a mixture thereof. The first strength-enhancing agent is added in an amount of from 0.0005% to 0.20% by weight of the cementitious material, and the second strength-enhancing agent is added in an amount of 0.05-0.30% $Na_2O$ equivalent by weight of the hydraulic cementitious material.

In a second example embodiment, the present invention is a cement composition provided by the methods disclosed herein.

In a third example embodiment, the present invention is an admixture composition for manufacturing cementitious compositions. The admixture composition comprises a first strength-enhancing agent and a second strength-enhancing agent. The first strength-enhancing agent includes a compound represented by structural formula (I):

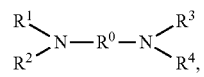

(I)

wherein each $R^1$, $R^2$, $R^3$, and $R^4$, independently is a $—(C_1$-$C_4)$alkyl-OH, and $R^0$ is a $(C_1$-$C_4)$ alkylene. The first strength-enhancing agent being present in the amount of 0.1 to 80% by dry weight solid of the admixture composition. The second strength-enhancing agent is sodium sulfate, potassium sulfate, or mixture thereof. The second strength-enhancing agent being present amount of 20 to 99.9% $Na_2O$ equivalent by dry weight solid of the admixture composition.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
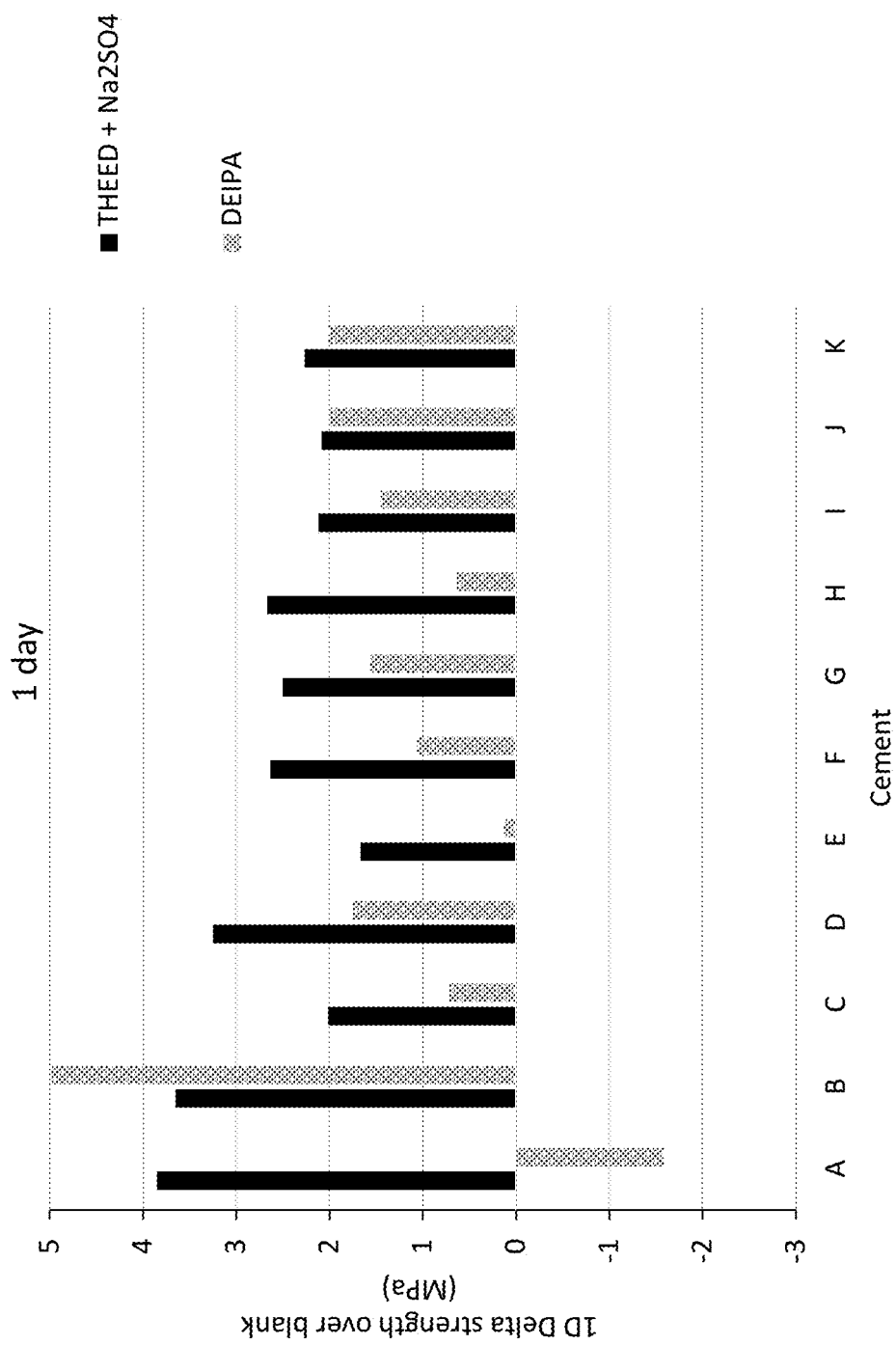
FIG. 1 is a bar plot showing "delta over blank," the difference of the compressive strength values (in MPa) at 1 day post mortar preparation between mortar samples with THEED at 0.02% by weight combined with $Na_2SO_4$ at 0.4% by weight of cementitious material to DEIPA alone at 0.02% by weight.

A description of example embodiments of the invention follows.

The conventional cement chemist notation uses the following abbreviations:
CaO=C
SiO2=S
$Al_2O_3$=A
$Fe_2O_3$=F
Under this notation, the following abbreviations are used:
tricalcium silicate=$C_3S$
dicalcium silicate=$C_2S$
tricalcium aluminate=$C_3A$
tetracalcium aluminoferrite=$C_4AF$ As used herein, "alkyl" means an optionally substituted saturated aliphatic branched or straight-chain monovalent hydrocarbon radical having the specified number of carbon atoms. Thus, "($C_1$-$C_4$) alkyl" means a radical having from 1-4 carbon atoms in a linear or branched arrangement. "($C_1$-$C_4$)alkyl" includes methyl, ethyl, propyl, isopropyl, n-butyl and tert-butyl.

As used herein, "alkanolmonoamine" means an alkyl, typically a $C_1$-$C_6$ alkyl, functionalized with one amino group and at least one hydroxyl group. Examples of alkanolmonoamines include triethanolamine or TEA, diethanol isopropanolamine or DEIPA, ethanol diisopropanolamine (EDIPA), and tri-isopropanolamine or TIPA.

As used herein, "alkanoldiamine" means an alkyl, typically a C1-C6 alkyl, functionalized with at least two amino groups and at least one hydroxyl group. An example of an alkanoldiamine includes tetrahydroxyethylethylenediamine (THEED).

As used herein, the "triisobutylphosphate" is a compound of structural formula $[(CH_3)_2CHCH_2O]_3PO$.

As used herein, the term "alkylene" means an optionally substituted saturated aliphatic branched or straight-chain bivalent hydrocarbon radical having the specified number of carbon atoms. Thus, "($C_1$-$C_4$) alkylene" means a radical having from 1-4 carbon atoms in a linear or branched arrangement. "($C_1$-$C_4$)alkyl" includes methylene, ethylene, propylene, isopropylene, etc.

Suitable optional substituents on any alkyl or alkylene include halogen, a C1-C4 alkyl, a C1-C4 haloalkyl, —OH, —O—($C_1$-$C_4$)alkyl, —O—($C_1$-$C_4$)haloalkyl, —CN, —$NH_2$, —NH($C_1$-$C_4$)alkyl, —N(($C_1$-$C_4$)alkyl)$_2$, and —$NO_2$.

As used herein, the term "ethylene oxide" refers to a monomeric unit of a homo- or copolymer having the following structural formula: —($C_2H_4$—O)—.

As used herein, the term "propylene oxide" refers to a monomeric unit of a homo- or copolymer having the following structural formula: —($C_3H_6$—O)—.

The terms "air detrainer" and "defoamers" are used interchangeably herein, and refer to compounds or mixtures of compounds that decrease foaming and minimizes air entrainment in cement slurries, grouts, concrete, and mortars. Examples of defoamers include the compounds and mixtures described in WO2015042031, the relevant portions of which are incorporated herein by reference.

The terms "viscosity modifying agent" and "viscosity modifying admixture" are used interchangeably herein and refer to compounds or mixtures of compounds chosen from (a) biopolymer polysaccharides chosen from S-657 (diutan gum), welan gum, xanthan, rhamsan, gellan, dextran, pullulan, curdlan, or derivatives thereof; (b) marine gums chosen from algin, agar, carrageenan, or derivatives thereof; (c) plant exudates chosen from locust bean, gum arabic, gum Karaya, tragacanth, Ghatti, or derivatives thereof; (d) seed gums chosen from guar, locust bean, okra, psyllium, mesquite, or derivatives thereof; or (e) starch-based gums chosen from ethers, esters, or derivatives thereof As used herein, the term "grinding aid" refers to a compound or a mixture of compounds that prevents agglomeration of particles of clinker during the grinding process, thus reducing the energy required for the grinding process. Examples of grinding aids are disclosed herein.

As used herein, the term "set accelerating agent" refers to a compound or a mixture of compounds that, when added to a cement, speeds the setting time. Examples of set accelerating agents are provided herein.

As used herein, the term "set retardation agent" refers to a compound of a mixture of compounds that, when added to a cement, retards the time of setting. Examples of set retardation agents are provided herein.

The terms "cement dispersant," "superplasticizer" and "water reducer" are used interchangeably herein to refer to chemical compounds of mixtures of chemical compounds used as dispersants, i.e. materials that, when added to a suspension of particles, results in the reduction of frictional resistance to flow without requiring additional water. The use of the dispersant further improves the suspension being improving dispersion of particles. These materials improve the flow characteristics (rheology) of concretes, reducing the water to cement ratio without affecting the workability of the mixture. Example of cement dispersants, superplasticizers, and water reducers are provided herein.

The content of all components in the compositions described below is indicated relative to the dry weight of the composition.

The terms "cement composition" or "cementitious powder" is used herein to designate a binder or an adhesive that includes a material that will solidify upon addition of water (hydraulic cementitious material), and an optional additive. Most cementitious materials are produced by high-temperature processing of calcined lime and a clay. When mixed with water, hydraulic cementitious materials form mortar or, mixed with sand, gravel, and water, make concrete. The terms "cementitious material," "cementitious powder," and "cement" can be used interchangeably.

Cement compositions includes mortar and concrete compositions comprising a hydraulic cement. Cement compositions can be mixtures composed of a cementitious material, for example, Portland cement, either alone or in combination with other components such as fly ash, silica fume, blast furnace slag, limestone, natural pozzolans or artificial pozzolans, and water; mortars are pastes additionally including fine aggregate, and concretes are mortars additionally including coarse aggregate. The cement compositions of this invention are formed by mixing certain amounts of required materials, e.g., a hydraulic cement, water, and fine or coarse aggregate, as may be applicable for the particular cement composition being formed.

As used herein, the term "clinker" refers to a material made by heating limestone (calcium carbonate) with other materials (such as clay) to about 1450° C. in a kiln, in a process known as calcination, whereby a molecule of carbon dioxide is liberated from the calcium carbonate to form calcium oxide, or quicklime, which is then blended with the other materials that have been included in the mix to form calcium silicates and other cementitious compounds.

As used herein, the term "Portland cement" include all cementitious compositions which meet either the requirements of the ASTM (as designated by ASTM Specification C150), or the established standards of other countries. Portland cement is prepared by sintering a mixture of components including calcium carbonate (as limestone), aluminum silicate (as clay or shale), silicon dioxide (as sand), and miscellaneous iron oxides. During the sintering process, chemical reactions take place wherein hardened nodules, commonly called clinkers, are formed. Portland cement clinker is formed by the reaction of calcium oxide with acidic components to give, primarily tricalcium silicate, dicalcium silicate, tricalcium aluminate, and a ferrite solid solution phase approximating tetracalcium aluminoferrite.

After the clinker has cooled, it is pulverized together with a small amount of gypsum (calcium sulfate) in a finish grinding mill to provide a fine, homogeneous powdery product known as Portland cement. Due to the extreme hardness of the clinkers, a large amount of energy is required to properly mill them into a suitable powder form. Energy requirements for finish grinding can vary from about 33 to 77 kWh/ton, depending upon the nature of the clinker and the type of the milling equipment. Several materials such as glycols, alkanolamines, aromatic acetates, etc., have been shown to reduce the amount of energy required and thereby improve the efficiency of the grinding of the hard clinkers. These materials, commonly known as grinding aids, are processing additives which are introduced into the mill in small dosages and interground with the clinker to attain a uniform powdery mixture. In addition to reducing grinding energy, the commonly used processing additives are frequently used to improve the ability of the powder to flow easily and reduce its tendency to form lumps during storage.

Clinker production involves the release of $CO_2$ from the calcination of limestone. It is estimated that for each ton of clinker produced, up to one ton of $CO_2$ is released to the atmosphere. The utilization of fillers such as limestone or clinker substitutes such as granulated blast furnace slags, natural or artificial pozzolans, pulverized fuel ash, and the like, for a portion of the clinker allow a reduction on the emitted $CO_2$ levels per ton of finished cement. As used herein, the term filler refers to an inert material that has no later age strength enhancing attributes; the term "clinker substitute" refers to a material that may contribute to long term compressive strength enhancement beyond 28 days. The addition of these fillers or clinker substitutes to form "blended cements" is limited in practice by the fact that such addition usually results in a diminution in the physical strength properties of the resultant cement. For example, when a filler, such as limestone, is blended in amounts greater than 5%, the resultant cement exhibits a marked reduction in strength, particularly with respect to the strength attained after 28 days of moist curing (28-day strength). As used herein, the term "blended cements" refers to hydraulic cement compositions containing between 2 and 90%, more conventionally between 5 and 70%, fillers or clinker substitute materials.

As used herein, the terms "Rietveld method" or "Rietveld XRD quantification" or "QXRD" refer to a qualitative phase analysis to determine the quantities of crystalline and amorphous phases in a measured XRD pattern. The Rietveld method uses a full profile fitting procedure of the measured XRD pattern to database of known phases.

As used herein, the term "blank" refers to a mortar mixing cement, sand and water, but not any of the tested additives.

The total alkali content of a cementitious material is expressed as "$Na_2O$ equivalent" and is determined as follows, in weight percent: % $Na_2O$ equivalent=% $Na_2O$+ 0.658*% $K_2O$, where the values of sodium and potassium in cement can be determined using X-ray fluorescence (XRF)

As used herein, the term "an alkali metal salt" refers to any salt of an alkali metal ion, e.g., $Na^+$, $K^+$. Examples of alkali metal ion sources include sodium sulfate, potassium sulfate, and the like.

In a first example embodiment, the present invention is a method of forming a cement composition. The method comprises adding to a hydraulic cementitious material a first strength-enhancing agent and a second strength-enhancing agent. In various aspects of the first example embodiment, the content of total alkali ($Na_2O$ equivalent) in the hydraulic cementitious material is less than or equal to 0.7% by weight of the cementitious material. The first strength-enhancing agent includes a compound represented by structural formula (I):

In formula (I), each R', $R^2$, $R^3$, and $R^4$, independently is a —($C_1$-$C_4$)alkyl-OH, and $R^0$ is a ($C_1$-$C_4$) alkylene. In various aspects of the first example embodiment, the first strength-enhancing agent is added in an amount of from 0.0005% to 0.20% by weight of the cementitious material. In various aspects of the first example embodiment, the second strength-enhancing agent is sodium sulfate, potassium sulfate, or mixture thereof and is added in an amount of 0.05-0.30 percent $Na_2O$ equivalent by weight of the hydraulic cementitious material.

In a second aspect of the first example embodiment, the second strength-enhancing agent is added in an amount of 0.15-0.30 percent, for example 0.17-0.25 percent $Na_2O$ equivalent, by weight of the hydraulic cementitious material.

In a third aspect of the first example embodiment, in formula (I), each of R', $R^2$, $R^3$, and $R^4$ independently is a —($C_2$-$C_3$)alkyl-OH, and $R^0$ is a ($C_2$-$C_3$)alkylene.

In a fourth aspect of the first example embodiment, the first strength-enhancing agent is tetrahydroxyethylethylenediamine (THEED).

In a fifth aspect of the first example embodiment, the method further comprises adding to the cement composition one or more of defoaming agents. In various aspects, the defoaming agent is chosen from: a triisobutylphosphate; an ethoxylated, propoxylated fatty alcohol represented by structural formula (II):

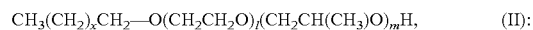

an ethoxylated, propoxylated alkylphenol represented by structural formula (III):

a polyalkoxylated polyalkylene polyamine represented by structural formula (IV):

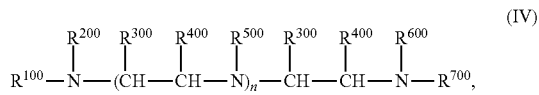

or salt thereof.

In structural formulas (II) and (III), x represents an integer from 2 to 18; 1 and m, for each occurrence independently, is an integer from 3 to 15; $R^{10}$ is a $C_4$-$C_{12}$ alkyl; and $R^{20}$ is a phenyl ring.

In structural formula (IV), each of $R^{100}$, $R^{200}$, $R^{300}$, $R^{400}$, $R^{500}$, $R^{600}$, and $R^{700}$ independently represents a hydrogen, $C_1$-$C_4$ alkyl group, —$CH_2$—OH, or -$(AO)_y$—$R^8$, wherein at least one of $R^{100}$, $R^{200}$, $R^{300}$, $R^{400}$, $R^{500}$, $R^{600}$, and $R^{700}$ is -$(AO)_y$—$R^8$, and wherein AO represents propylene oxide ("PO") or a mixture of PO and ethylene oxide ("EO"), wherein the molar ratio of PO to EO is at least 100:0 to 100:90; y is an integer from 4 to 100; $R^8$ is hydrogen or a C1-C12 alkyl group; and n is 0 or an integer from 1 to 100.

Defoamers of structural formulas (II), (III), and (IV) can each be added in a 19:1 to 1:1 weight ratio of the first strength-enhancing agent to defoamer (by dry solids weight).

In some examples of the fifth aspect, when the defoamer is the compound represented by structural formula (IV), if "n" is 0, then the amount of EO is less than 10% by weight based on total weight of the polyalkoxylated polyalkylene polyamine.

In a sixth aspect of the first example embodiment, the method further includes adding to the hydraulic cementitious material a viscosity modifying agent for stabilizing the defoaming agent.

In various example embodiments of the sixth aspect, viscosity modifying agent can be chosen from (a) biopolymer polysaccharides chosen from S-657 (diutan gum), welan gum, xanthan, rhamsan, gellan, dextran, pullulan, curdlan, or derivatives thereof; (b) marine gums chosen from algin, agar, carrageenan, or derivatives thereof; (c) plant exudates chosen from locust bean, gum arabic, gum Karaya, tragacanth, Ghatti, or derivatives thereof; (d) seed gums chosen from guar, locust bean, okra, psyllium, mesquite, or derivatives thereof; or (e) starch-based gums chosen from ethers, esters, or derivatives thereof. In various examples, the biopolymer polysaccharide can be used in an amount of 0.01 to 1.0 percent, for example 0.1 percent to 0.3 percent, based on total weight of the cement grinding additive composition.

In a seventh aspect of the first example embodiment, the first strength-enhancing agent further includes one or more of triisopropanolamine (TIPA), triethanolamine (TEA), diethanolisopropanolamine (DEIPA), or ethanol diisopropanolamine (EDIPA).

In an eighth aspect of the first example embodiment, the content of total alkali ($Na_2O$ equivalent) in the hydraulic cementitious material is less than or equal to 0.7% by weight of the cementitious material; the first strength-enhancing agent includes tetrahydroxyethylethylenediamine (THEED), and the first strength-enhancing agent is added in an amount of from 0.001% to 0.02% by weight of the cementitious material; and the second strength-enhancing agent is added in an amount of from 0.17 to 0.25% $Na_2O$ equivalent by weight of the hydraulic cementitious material.

In a ninth aspect of the first example embodiment, the method further comprises adding to the hydraulic cementitious material at least one additional component chosen from a grinding aid, a set retarding agent, or a set accelerating agent.

In various example embodiments, the grinding aid can be one or more of a glycol, glycerin, alkanolamine, amine, or acetic acid or an acetic acid salt, and can be added in an amount of 0.001% to 0.06% based on dry weight of the hydraulic cementitious material.

In various example embodiments, the set retarding agent can be one or more of a gluconate salt, a molasses, sucrose, lignosulfonate, or a corn syrup, and can be added in the amount of 0.001-0.06% based on dry weight of the hydraulic cementitious powder.

In various the set accelerating agent can be one or more of a thiocyanate salt, nitrate salt, nitrite salt, thiosulfate salt, or a chloride salt, and can be added in the amount of 0.001% to 0.2% based on dry weight of the hydraulic cementitious material.

In a tenth aspect of the first example embodiment, the hydraulic cementitious material comprises Portland cement or cement clinker, and, optionally, further includes one or more of fly ash, granulated blast furnace slag, limestone, natural pozzolan, or calcined clay.

In a eleventh aspect of the first example embodiment, the first strength-enhancing agent and the second strength-enhancing agent are mixed prior to adding to the hydraulic cementitious material, thereby forming a mixture (also referred to herein as a "pre-mixture") of the strength-enhancing agents.

In various example embodiments of the eleventh aspect, the weight ratio of the first strength enhancing agent to the second strength enhancing agent in the mixture of the strength-enhancing agents is from 1:600 to 10:1. In another example, the weight ratio is 1:250 to 1:8.5.

In a twelfth aspect of the first example embodiment, the first strength-enhancing agent is a liquid and the second strength-enhancing agent is a powder, said powder further optionally including one or more of gypsum, fly ash, blast furnace slag, limestone, natural pozzolan, or calcined clay.

In a thirteenth aspect of the first example embodiment, the first and the second strength-enhancing agents are as described above with respect to the eleventh aspect, and further the first strength-enhancing agent further includes one or more of: a grinding aid, wherein the weight ratio of the grinding aid to the compound of structural formula (I) is from 60:1 to 1:20; a set retarding agent, wherein the weight ratio of the set retarding agent to the compound of structural formula (I) is from 60:1 to 1:20; a set accelerating agent, wherein the weight ratio of the set accelerating agent to the compound of structural formula (I) is from 200:1 to 1:20; or a defoamer, wherein the weight ratio of the defoamer to the compound of structural formula (I) is from 1.6:1 to 1:50.

In various example embodiments of the thirteenth aspect, the first strength enhancement agent is present in the amount of from 0.001% to 0.02% based on dry weight of the hydraulic cementitious powder, the at least one grinding aid is added in the amount of from 0.001% to 0.06% based on dry weight of the hydraulic cementitious powder, the set retarding agent is added in the amount of from 0.001% to 0.06% based on dry weight of the hydraulic cementitious powder, and the set accelerating agent is added in the amount of 0.001% to 0.2% based on dry weight of the hydraulic cementitious powder; the defoamer is added in the amount of 0.0004% to 0.0016% based on dry weight of the hydraulic cementitious powder.

In a fourteenth aspect of the first example embodiment, the method further comprises adding to the hydraulic cementitious material one or more of a cement dispersant, a superplasticizer or a water-reducer. Examples of suitable materials include polycarboxylate ethers, polycarboxylate comb polymers, naphthalene sulfonate formaldehyde condensate, melamine sulfonate formaldehyde condensate and lignosulfonate salts.

In a second example embodiment, the present invention is a cement composition provided by any method described in the first through fourteenth aspects of the first example embodiment.

In a third example embodiment, the present invention is an admixture composition for manufacturing cementitious compositions. The admixture composition comprises a first strength-enhancing agent and a second strength-enhancing agent. The first strength-enhancing agent includes a compound represented by structural formula (I):

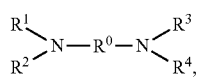
(I)

wherein each $R^1$, $R^2$, $R^3$, and $R^4$, independently is a —($C_1$-$C_4$)alkyl-OH, and $R^0$ is a ($C_1$-$C_4$) alkylene.

In various aspects of the third example embodiment, the first strength-enhancing agent is present in the amount of 0.1 to 80% by dry weight solid of the admixture composition; the second strength-enhancing agent is sodium sulfate, potassium sulfate, or a mixture thereof; and the second strength-enhancing agent being present amount of 20 to 99.9% $Na_2O$ equivalent by dry weight solid of the admixture composition.

In a first aspect of the third example embodiment, in formula (I), each of $R^1$, $R^2$, $R^3$, and $R^4$ independently is a —($C_2$-$C_3$)alkyl-OH, and $R^0$ is a ($C_2$-$C_3$)alkylene.

In a second aspect of the third example embodiment, the first strength-enhancing agent is tetrahydroxyethylethylenediamine (THEED).

In a third aspect of the third example embodiment, the admixture composition further comprising one or more of defoaming agents described with respect to the fifth aspect of the first example embodiment.

In a fourth aspect of the third example embodiment, the admixture further comprises a viscosity modifying agent for stabilizing the defoaming agent described above with respect to the sixth aspect of the first example embodiment.

In the fifth aspect of the third example embodiment, the admixture composition further comprises at least one additional component chosen from a grinding aid, a set retarding agent, or a set accelerating agent, as described with respect to the ninth aspect of the first example embodiment.

The cementitious material and the strength-enhancing agents are described above with respect to the first through fourteenth aspects of the first example embodiment.

In various aspects of the third example embodiment, the strength-enhancing agent and, optionally additional additives, are added to the cementitious material in a single step.

Alkali metal salts have been previously used to address low early strength of cements. Such solution presents several drawbacks. First, it has been reported that alkali salts decrease long-term compressive strength, usually measured at 28 days post formation. Second, an accelerating effect is only observed at high concentration of additives, making this approach economically undesirable. Other early strength enhancers, such as alkanolmonoamines (triethanolamine (TEA), triisopropanolamine (TIPA), diethanolisopropanolamine (DEIPA)), show selective effect that depends on the composition of the cementitious material.

It has now been discovered that combinations of an alkali metal salt (for example, sodium sulfate, potassium sulfate and mixtures threreof) and certain alkanoldiamines (for example, THEED) act as a potent strength enhancer of hydraulic cementitious materials, improving in certain instances both early and late compressive strengths. The effect of the combination can be synergistic, i.e. the effect of the combination exceeds the combined effects of the individual components. This synergistic effect permits the use of low final content of the alkali metal salt, thus maintaining the positive effect on the early strength without undermining the late strength.

A particular advantage of the additive of the invention is that it may be either interground or intermixed with the cement. As used herein, the terms "interground" and "intermixed" refer to the particular stage of the cement processing in which the additives are added. They may be added to the clinker during the finish grinding stage and thus interground to help reduce the energy requirements and provide a uniform free flowing cement powder with reduced tendency to form lumps during storage. It is also possible to add the additives as an admixture to powdered cement either prior to, in conjunction with, or after the addition of water when effecting the hydraulic setting of the cement. Further, the additives described herein can be supplied in a pure concentrated form, or diluted in aqueous composition, and may also be used in combination with other chemical admixtures, including but not limited to: accelerating admixtures, air entrainers, air detrainers, water-reducing admixtures, retarding admixtures (as defined in ASTM C494) and the like, and mixtures thereof. The additive according to the invention may be used with ordinary cement or with blended cements.

One skilled in the art, using the preceding detailed description, can utilize the present invention to its fullest extent. The following examples are provided to illustrate the invention, but should not be construed as limiting the invention in any way except as indicated in the appended claims. All parts and percentages are by weight unless otherwise indicated and additives are expressed as percent active ingredient as solids based weight of dry cement (% s/c). Compressive strengths of the cement samples were determined in accordance with EN method 196-1. The following examples were prepared using commercially available cements and clinkers.

EXEMPLIFICATION

Background information on the Characterization of Elemental Composition of Cement and Clinker Samples The elemental composition for each of the cement samples used in the following examples was determined using X-ray fluorescence (XRF). Results are presented in Table 1 in % by weight. The clinker phases were analyzed using X-ray diffraction (QXRD) using the Rietveld refinement method. Results are presented in Table 2 in % by weight.

TABLE 1

Elemental composition by XRF (% by weight)

| Cement | A | B | C | D | E | F | G | H | I | J | K | L |
|---|---|---|---|---|---|---|---|---|---|---|---|---|
| $SiO_2$ | 20.9 | 19.5 | 21.3 | 21.9 | 21.9 | 19.9 | 20.1 | 20.34 | 21.55 | 19.87 | 21.0 | 20.79 |
| $Al_2O_3$ | 5.1 | 5.51 | 3.95 | 4.64 | 4.72 | 4.88 | 4.62 | 5.34 | 3.99 | 5.38 | 4.27 | 4.87 |
| $Fe_2O_3$ | 3.55 | 2.39 | 3.62 | 3.54 | 3.42 | 4.51 | 3.86 | 3.87 | 3.65 | 2.59 | 3.78 | 3.73 |
| CaO | 63.4 | 62.5 | 63.9 | 65.4 | 64.3 | 64.5 | 64.8 | 64.23 | 64.46 | 63.38 | 62.7 | 63.09 |
| MgO | 1.56 | 3.82 | 1.13 | 1.26 | 0.62 | 1.7 | 2.22 | 1.11 | 1.14 | 3.36 | 1.4 | 2.05 |
| $SO_3$ | 2.64 | 2.63 | 3.71 | 0.97 | 2.89 | 2.7 | 2.89 | 2.88 | 3.00 | 2.53 | 3.43 | 3.04 |
| $Na_2O$ | 0.23 | 0.38 | 0.19 | 0.16 | 0.15 | 0.16 | 0.04 | 0.25 | 0.20 | 0.11 | 0.09 | 0.17 |
| $K_2O$ | 0.36 | 0.06 | 0.24 | 0.61 | 0.46 | 0.18 | 0.16 | 0.47 | 0.24 | 0.01 | 0.39 | 0.71 |
| $TiO_2$ | 0.25 | 0.33 | 0.30 | 0.19 | 0.26 | 0.24 | 0.39 | 0.25 | 0.30 | 0.33 | 0.26 | 0.29 |
| $P_2O_5$ | 0.20 | 0.07 | 0.34 | 0.19 | 0.15 | 0.19 | 0.07 | 0.15 | 0.35 | 0.07 | 0.17 | 0.22 |
| $Mn_2O_3$ | 0.03 | 0.16 | 0.05 | 0.26 | 0.03 | 0.03 | 0.06 | 0.04 | 0.051 | 0.14 | 0.39 | 0.10 |
| SrO | 0.07 | 0.06 | 0.09 | 0.20 | 0.06 | 0.17 | 0.06 | 0.06 | 0.10 | 0.03 | 0.09 | 0.05 |
| $Cr_2O_3$ | 0.02 | 0.03 | 0.02 | 0.01 | 0.02 | 0.03 | 0.02 | 0.04 | 0.02 | 0.04 | 0.02 | 0.02 |
| ZnO | 0.04 | 0.06 | 0.02 | 0.03 | 0.06 | 0.01 | 0.01 | 0.13 | 0.02 | 0.07 | 0.03 | 0.01 |
| L.O.I. (950° C.) | 1.05 | 2.37 | 0.94 | 0.21 | 0.95 | 1 | 1.2 | 1.03 | 0.94 | 1.81 | 1.89 | 0.89 |
| Total Na2O eq | 0.47 | 0.42 | 0.35 | 0.56 | 0.46 | 0.28 | 0.15 | 0.56 | 0.35 | 0.12 | 0.34 | 0.63 |

"L.O.I." stands for "loss on ignition"

TABLE 2

Clinker phases composition by QXRD (% by weight)

| Cement | A | B | C | D | E | F | G | H | I | J | K | L |
|---|---|---|---|---|---|---|---|---|---|---|---|---|
| Alite | 53.9 | 59.6 | 53.7 | 64.5 | 51.7 | 71.8 | 71.6 | 56.6 | 52.3 | 68.2 | 54.1 | 61.0 |
| Belite | 24.9 | 11.8 | 27.3 | 16.5 | 25.4 | 5.3 | 6.4 | 19.1 | 30.8 | 6.4 | 22.2 | 16.5 |
| C4AF | 10.5 | 5.4 | 9.2 | 9.3 | 8.7 | 11.6 | 10.3 | 10.1 | 10 | 8.3 | 11.1 | 10.2 |
| C3A_cubic | 3.0 | 6.5 | 1.1 | 1.7 | 3.9 | 1.9 | 2.0 | 3.5 | 1.0 | 6.4 | 1.4 | 2.6 |
| C3A_ortho | 1.4 | 4.1 | 1.0 | 1.0 | 2.3 | 1.6 | 1.3 | 3.1 | 1.0 | 0 | 0 | 1.1 |

Example 1: Combination of THEED and Sodium Sulfate Enhances Early Strength of Cement Compositions This example illustrates the effect of the combination of THEED and sodium sulfate on the compressive strength of mortars produced from different cements described in Example 1 at Day 1 post-mortar preparation.

Mortars were prepared following the EN 196-1 testing protocol, where 450 grams of cement are mixed with 225 grams of water and 1350 grams of a graded sand meeting EN 196-1 specifications. Additives were added to the water before adding water to the cement g. The mortar prepared this way was used to cast 40×40×160 mm prismatic specimens that were submitted to compression until rupture after 1 and 28 days of curing. The rupture load was converted to compressive strength (in MPa).

THEED+$Na_2SO_4$ solution was prepared in two steps. $Na_2SO_4$ was first added to achieve final content of 0.4% by weight of the cementitious material in the mixing water. Then THEED was added to achieve the final content of 0.02% by weight of cementitious material Either the THEED+$Na_2SO_4$ combination or diethanolisopropanolamine (DEIPA) alone, at 0.02% by weight of cementitious material, were used as additives. For each tested sample, the value of the compressive strength of a control (no additive) was deducted from the value of the compressive strength of the sample and the results plotted as bars shown in FIG. 1.

The data presented in FIG. 1 demonstrates that all cement compositions that include THEED+$Na_2SO_4$ combination have enhanced 1 day compressive strength. Furthermore, in all but one tested case the enhancing effect of THEED+ $Na_2SO_4$ combination on 1-day compressive strength of mortar samples exceeded the effect of DEIPA.

Example 2: Combination of THEED and Sodium Sulfate has Synergistic Effect on Early Strength of Cement Compositions This example illustrates the synergistic effect between sodium sulfate and THEED at Day 1 post mortar preparation.

Using the cement samples described in Tables 1 and 2, mortars were produced as described in Example 1. Sodium sulfate was added to achieve the final content of 0.4% by weight of the cementitious material and THEED was added to achieve the final content of 0.02% by weight of the cementitious material. Compressive strengths were measured at 1 day and 28 days post mortar preparation as described above in Example 1.

Figure 2:
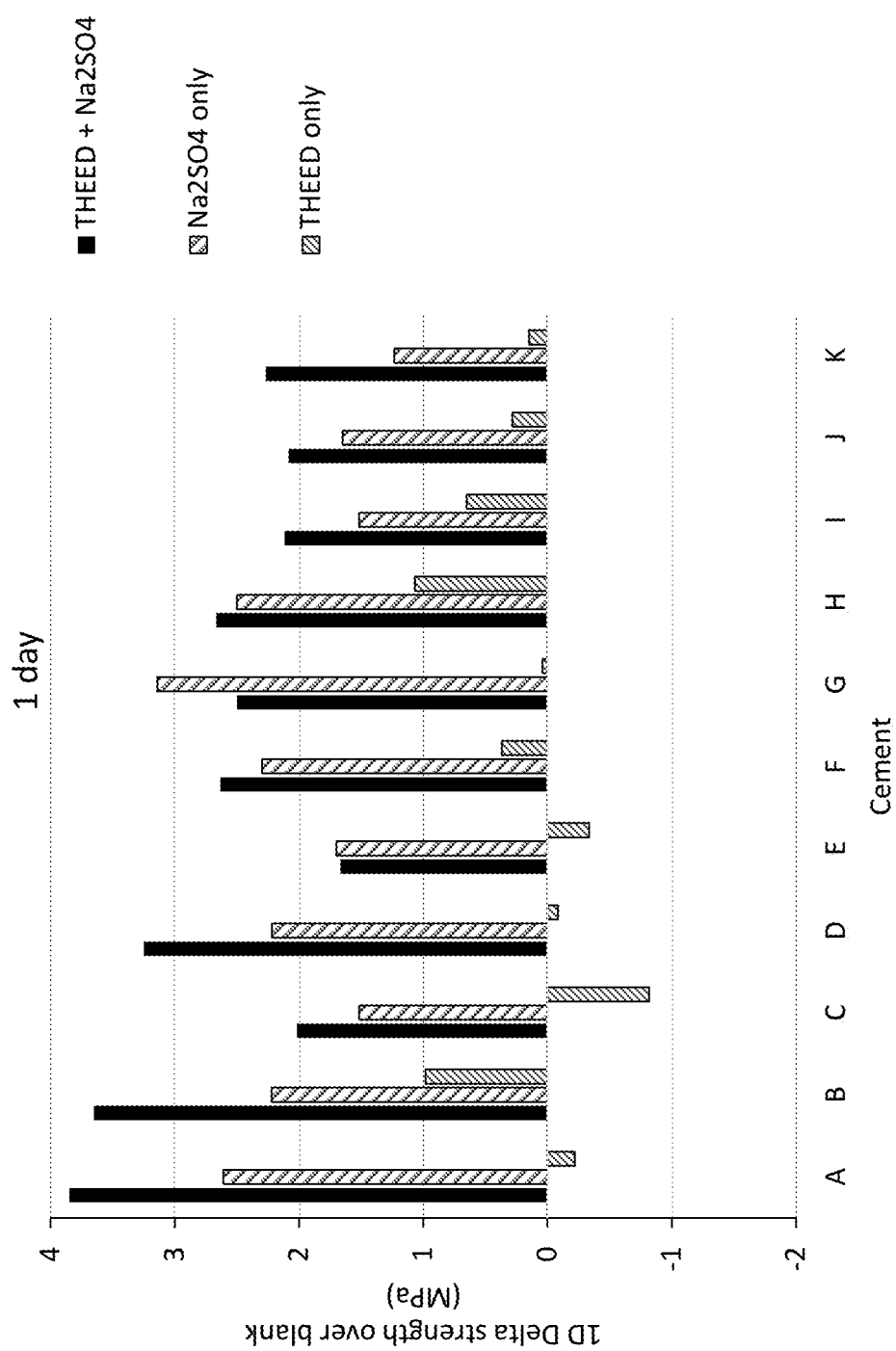
FIG. 2 is a bar plot showing "delta over blank," the difference of the compressive strength values (in MPa) at 1 day post mortar preparation between mortar samples with and without the indicated additives (sodium sulfate at 0.4% by weight of cementitious material in combination with THEED at 0.02% by weight or sodium sulfate at 0.4% by weight alone or THEED at 0.02% by weight alone).

For each tested sample, the value of the compressive strength of a control (no additive) was deducted from the value of the compressive strength of the sample and the results plotted as bars shown in FIG. 2. The results demonstrate that the effect of the combination of THEED and sodium sulfate on compressive strength at 1 day post mortar preparation is, in most instances, higher than the effects of sodium sulfate alone or THEED alone.

Moreover, the data indicates that the combination of the two additives can have a surprising synergistic effect. To demonstrate this effect, a synergistic index was computed according to the following equation:

Synergistic index=$\Delta$(Strength$_{Na2SO4+THEED}$ −Strength$_{blank}$)−($\Delta$(Strength$_{Na2SO4}$−Strength$_{blank}$)+$\Delta$ (Strength$_{THEED}$−Strength$_{blank}$)), where "Strength" is a compressive strength value of the mortar that includes the additive indicated in the subscript ("blank" stands for the "no additive" control).

If synergistic index is positive, there is synergy between the two additives (i.e. the effect of the combination is greater than the combined effects of each additive). If synergistic is equal to zero, there is an additive effect of the additives. If synergistic index is negative, there is an antagonistic effect of the combination of additives.

Figure 3:
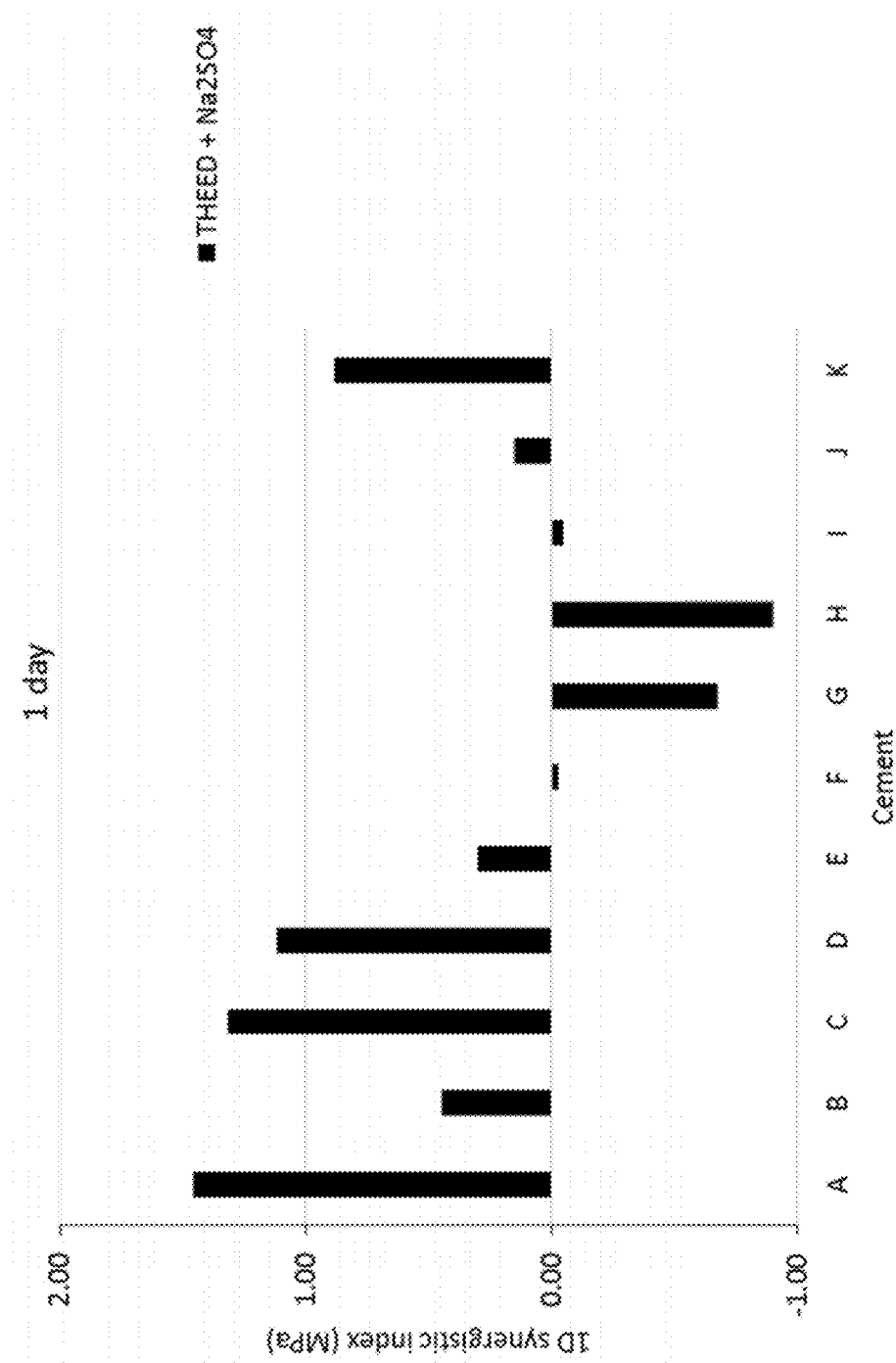
FIG. 3 is a bar plot showing the value of synergistic index (in MPa) of THEED and sodium sulfate combination at the concentrations indicated in FIG. 2, measured using the values of compressive strength at 1 day post mortar production.

The value of synergistic index (in MPa) of the THEED+ $Na_2SO_4$ combination was computed using the data shown in FIG. 2. The results of this computation are presented in FIG. 3. These results indicate that in all but four tested cases the combination of THEED and sodium sulfate has synergistic effect.

Example 3: Combination of THEED and Sodium Sulfate Synergistically Enhances Late Strength of Cement Compositions This example illustrates the effect of the combination of THEED and sodium sulfate on the compressive strength of mortars produced from different cements described in Tables 1 and 2 at 28 days post-mortar preparation and demonstrates that the effect of the combination of sodium sulfate and THEED at 28 days post mortar preparation is synergistic.

Sodium sulfate is known to have a detrimental effect on long-term (for example, 28 days) compressive strength of cement compositions. However, surprisingly, when used in combination with THEED, the detrimental effect of sodium sulfate on the late compressive strength of cement compositions is avoided.

Compressive strengths of cement compositions described in Example 2 were measured at 28 days post mortar production. For each tested sample, the value of the compressive strength of a control (no additive) was deducted from the value of the compressive strength of the sample and the results plotted as bars shown in FIG. 4. The results indicate that while sodium sulfate alone significantly reduces the late compressive strength of cements, the combination of THEED and sodium sulfate not only overcomes this negative effect, but, in fact, improves the late compressive strength relative to the cement compositions that do not include the additives.

Figure 4:
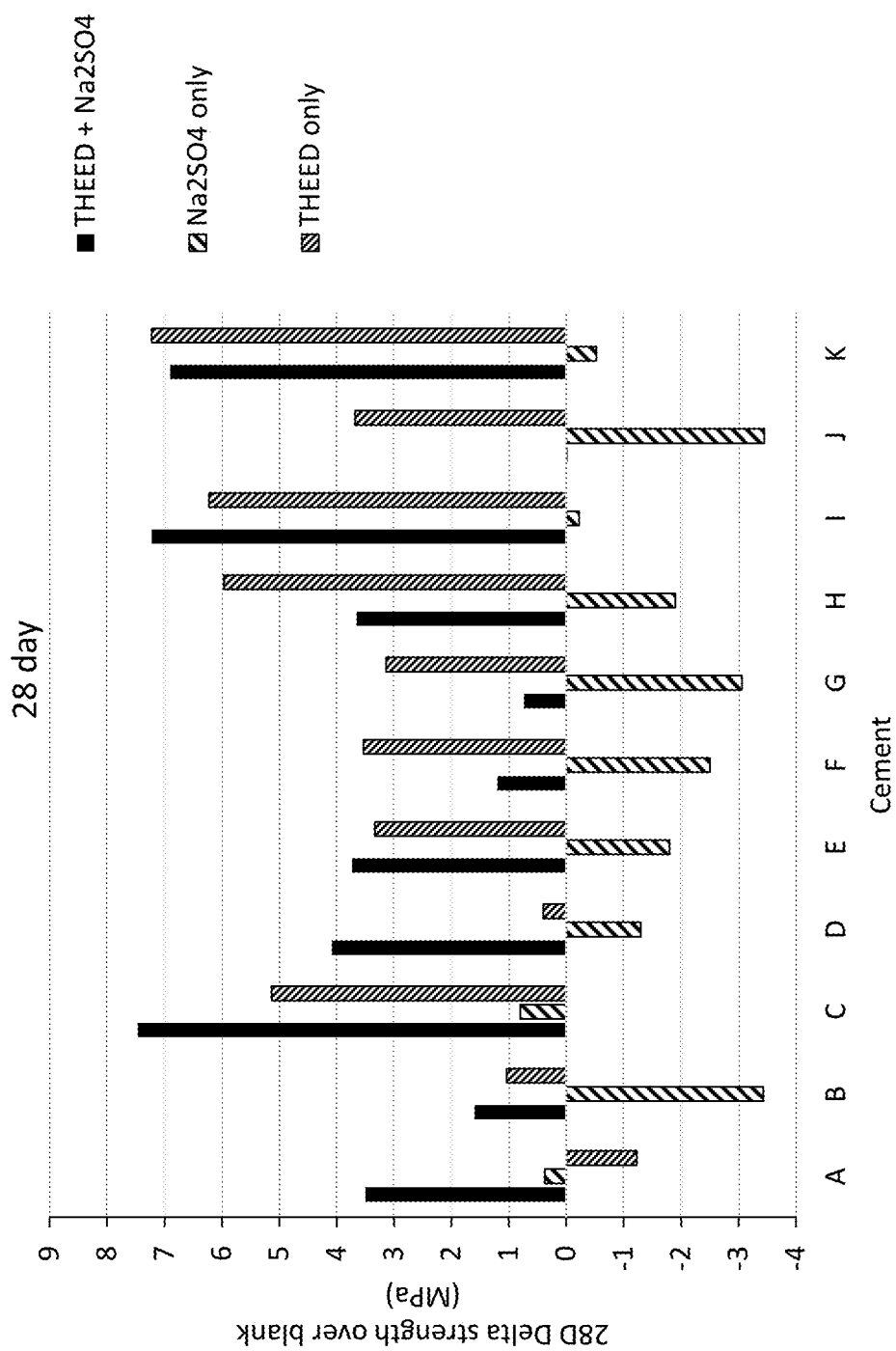
FIG. 4 is a bar plot showing "delta over blank," the difference of the compressive strength values (in MPa) at 28 days post mortar preparation between mortar samples with and without the indicated additive (THEED alone, $Na_2SO_4$ alone or the combination of the two; THEED at 0.02% by weight, sodium sulfate at 0.4% by weight).
Figure 5:
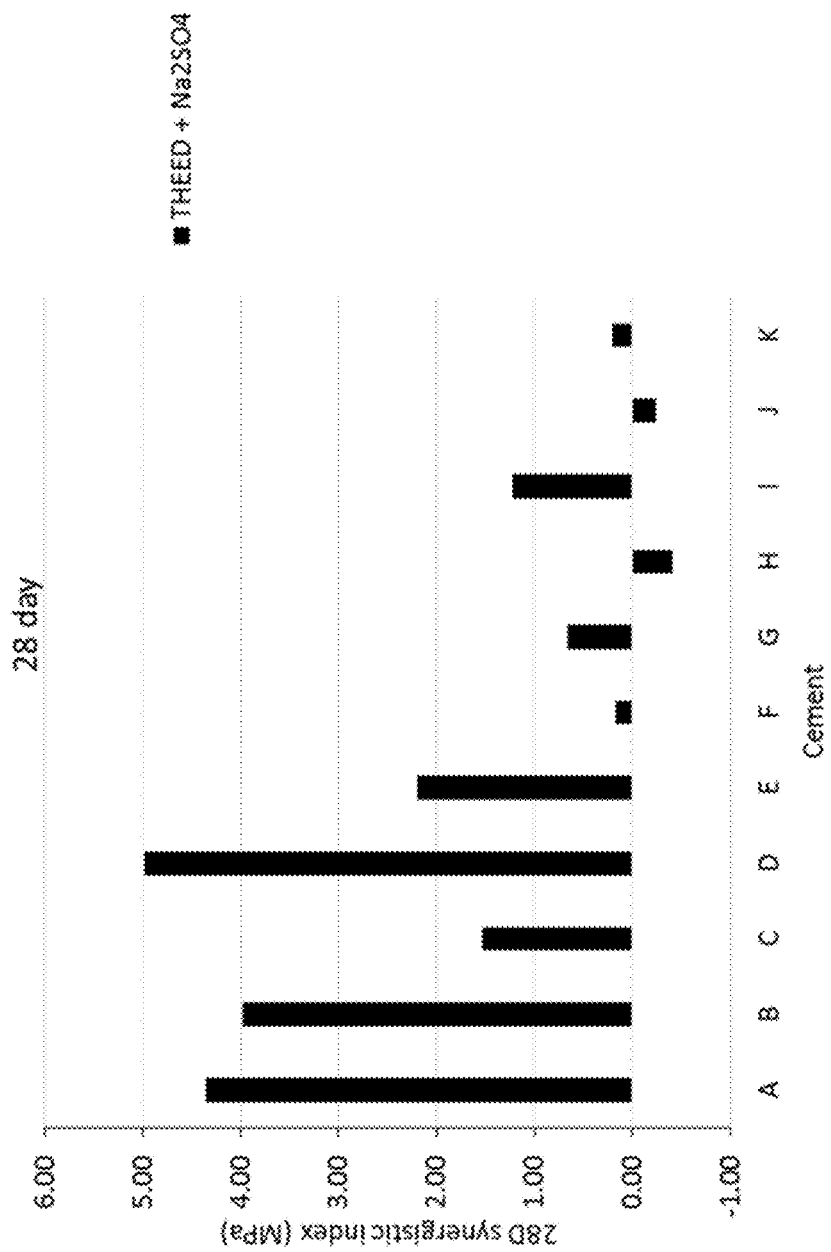
FIG. 5 is a bar plot showing the value of synergistic index (in MPa) of THEED and sodium sulfate combination based on the values shown in FIG. 4, measured using the values of compressive strength at 28 days post mortar production.

The value of synergistic index described in Example 2 was computed using the data shown in FIG. 4. The results of this computation are presented in FIG. 5. These results indicate that the combination of THEED and sodium sulfate can have a synergistic effect at 28 days post mortar production.

Example 5: Comparison of Alkanolamine/Alkali Metal Ion Sources

This example provides data comparing the effect on compressive strength of cement compositions prepared using cement A (see Tables 1 and 2 above) and different alkanolamine/alkali metal ion source combinations.

In this experiment, two alkali metal salts ($K_2SO_4$, and $Na_2SO_4$) and THEED, triethanolamine (TEA), triisopropanolamine (TIPA), or diethanolisopropanolamine (DEIPA) were used to create samples comprising eight different combinations of additives and one control sample ("blank"). For each combination, the alkali metal ion was added to achieve the final content of 0.2% of $Na_2O$ equivalent by weight of the cementitious material, and the THEED, TEA, TIPA or DEIPA was added to achieve the final content of 0.02% by weight of the cementitious material.

Figure 6:
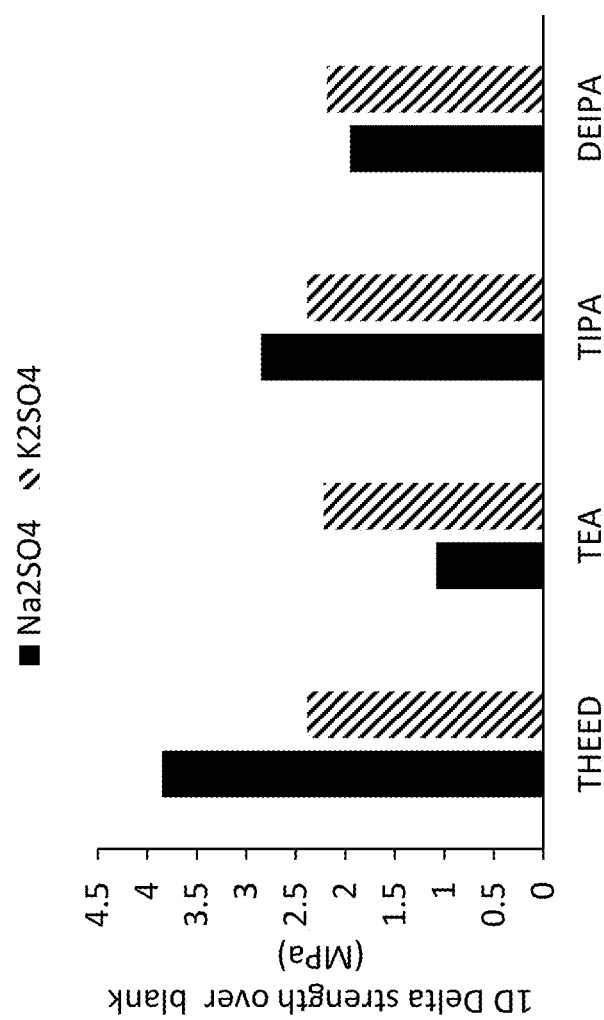
FIG. 6 is a bar plot showing "delta over blank," the difference of the compressive strength values (in MPa) at 1 day post mortar preparation between mortar samples prepared from cement A with and without the indicated additives (alkanolamines are at 0.02% by weight each, sources of alkali metal ion are at 0.2% of $Na_2O$ equivalent each).

For each tested sample, the value of the compressive strength of a control (no additive) was deducted from the value of the compressive strength of the sample and the results plotted as bars shown in FIG. 6. The results show that, in general, cement compositions that include a combination of $K_2SO_4$, and $Na_2SO_4$ and THEED, TEA, TIPA or DEIPA have enhanced early strength. However, the combination of sodium sulfate and THEED results in the greatest improvement at 1 day. At 28 days, the positive effect of the combination including TREED is maintained, as evidenced by the data presented in FIG. 7.

Figure 7:
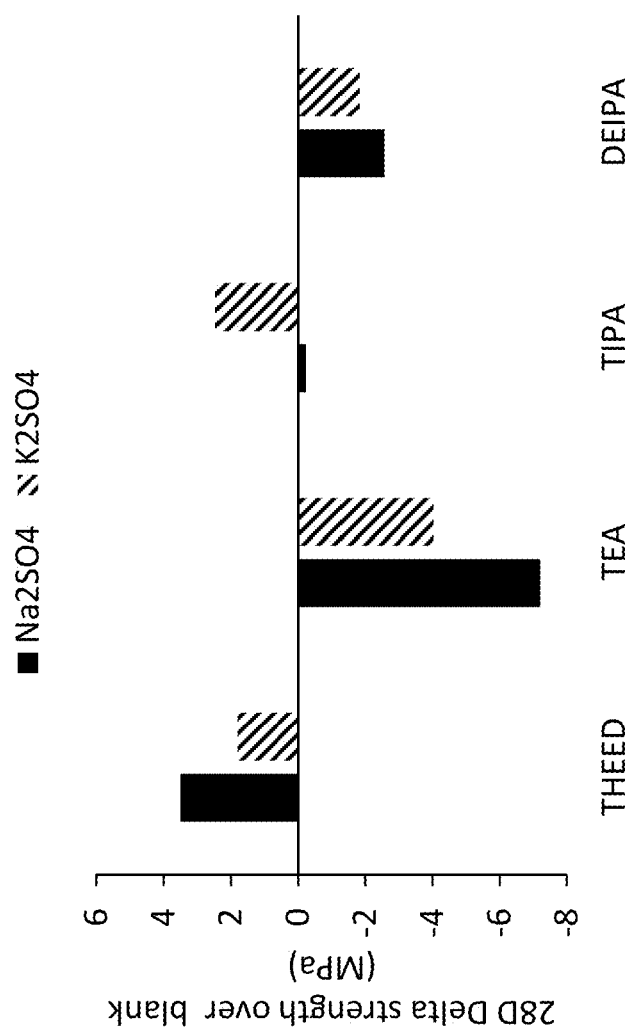
FIG. 7 is a bar plot showing "delta over blank," the difference of the compressive strength values (in MPa) at 28 day post mortar preparation between mortar samples with and without the indicated additives (alkanolamines are at 0.02% by weight each, sources of alkali metal ion are at 0.2% of $Na_2O$ equivalent each).
Figure 8:
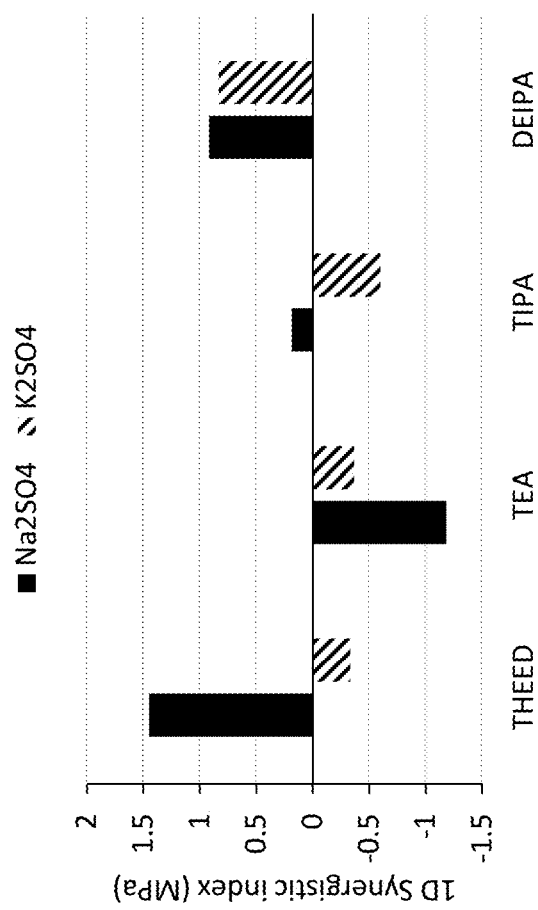
FIG. 8 is a bar plot showing the value of synergistic index at 1 day (in MPa) of the indicated combinations, measured using the values of shown in FIG. 6.
Figure 9:
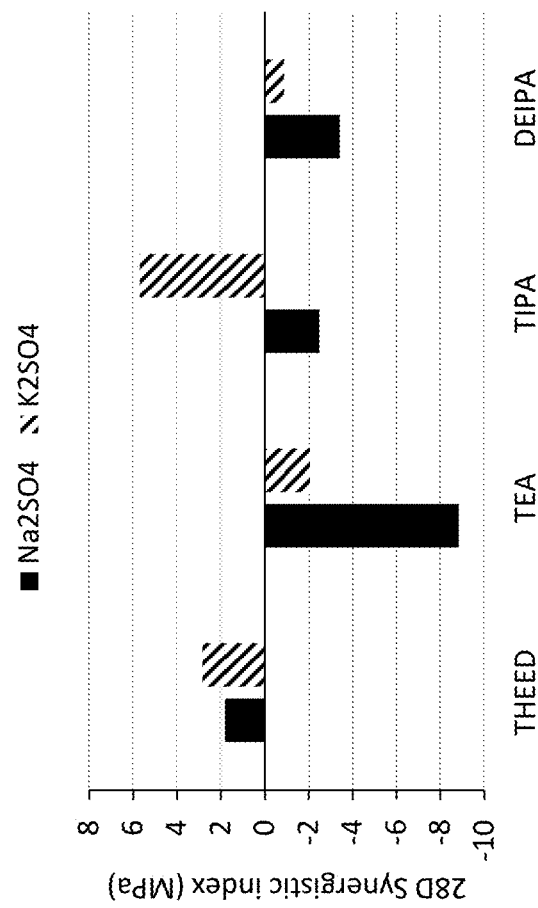
FIG. 9 is a bar plot showing the value of synergistic index at 28 days (in MPa) of the indicated combinations, measured using the values shown in FIG. 7.

The value of synergistic indices, as described in Example 2, were computed using the data shown in FIG. 6 and FIG. 7. The results are presented in FIG. 8 (1 day post mortar production) and FIG. 9 (28 days post mortar production).

The results indicate that the combination of THEED and sodium sulfate is one of only two tested combinations that exhibit synergistic effect at both 1 day and 28 days post mortar production.

Example 5: Effect of Final Content of Additives in Cement Composition

This example illustrates various ratios of sodium sulfate and THEED dosage.

Figure 10:
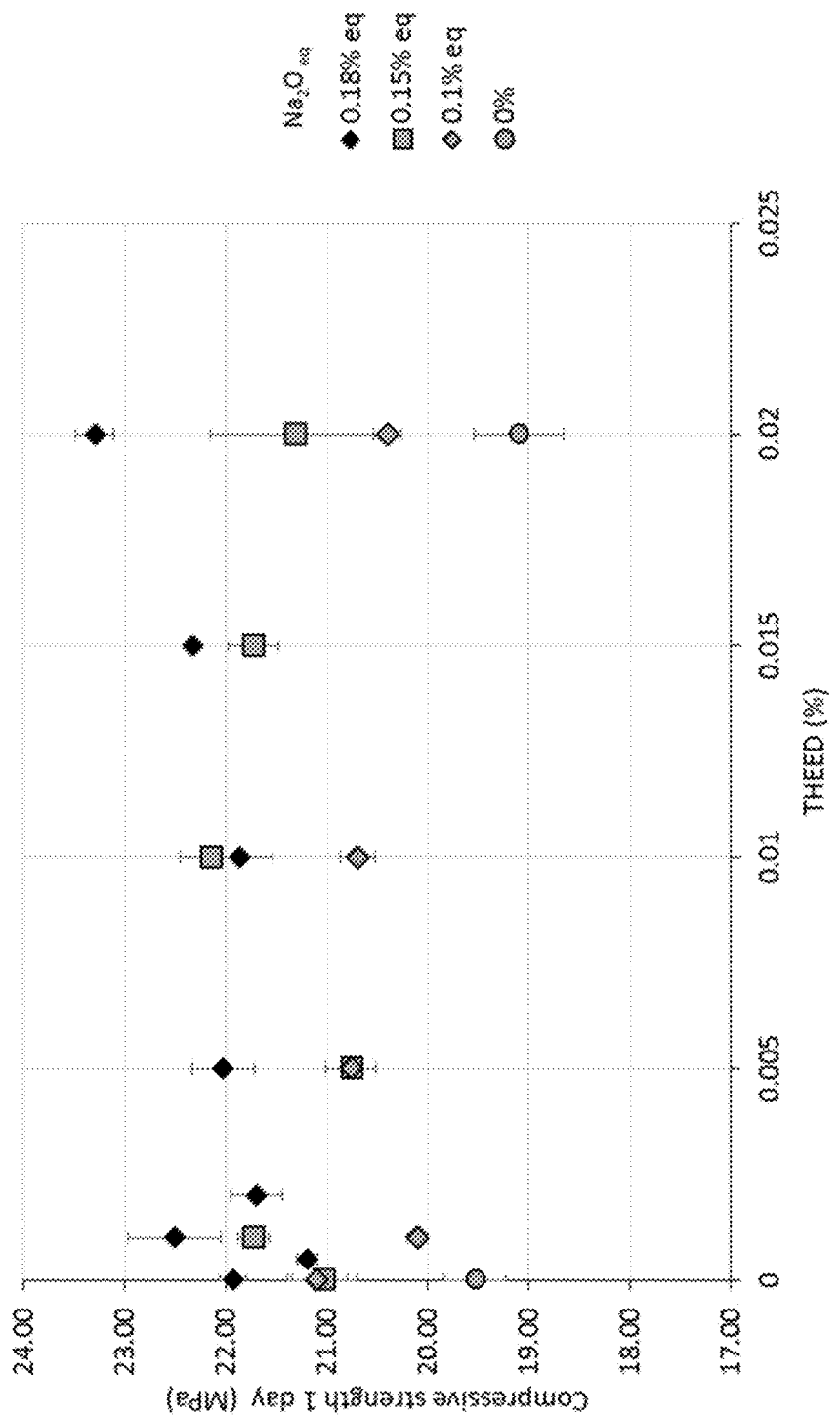
FIG. 10 is a plot of 1 day post mortar production compressive strength (MPa) of a cement composition that includes cement A and sodium sulfate at the indicated final content (% by weight of cementitious material) as a function of the final content of THEED (% by weight of cementitious material).

Mortars were produced using cement A as described in Example 2. Sodium sulfate was added to achieve the indicated final content (0.18%. 0.15%, 0.10% and 0% of $Na_2O$ equivalent by weight of cementitious material). THEED was added prior to mixing at varying dosages to achieve the final content as indicated in FIG. 10, from 0% to 0.02% by weight of the cementitious material.

Compressive strength of the mortar samples was measured at 1 day post mortar preparation. The results are presented in FIG. 10.

Example 6: THEED+Sodium Sulfate Combination is an Effective Grinding Aid

This example illustrates the use of THEED+$Na_2SO_4$ combination as a grinding aid.

The grinding efficiency was studied on a lab-scale ball mill. Clinker and balls were pre-heated overnight and placed in the hot ball mill at 116° C. To compare the grinding efficiency, a reference cement "R" was prepared using DIEG, a traditional grinding aid. 0.69 g of DIEG was added to 3325 g of clinker and 133 g of hemihydrate. These ingredients were ground for 2 hours in a laboratory ball mill at 116° C. to produce cement for testing. The chemical composition of the cement R is presented in Table 3.

TABLE 3

| | Cement | | |
|---|---|---|---|
| | R | S | T |
| | | Grinding aid | |
| % wt | DIEG | $Na_2SO_4$ + THEED liquid | $Na_2SO_4$ + THEED solid |
| SiO2 | 21.22 | 21.14 | 21.16 |
| Al2O3 | 5.28 | 5.19 | 5.21 |
| Fe2O3 | 3.5 | 3.48 | 3.48 |
| CaO | 63.59 | 63.45 | 63.38 |
| MgO | 1.59 | 1.57 | 1.57 |

TABLE 3-continued

|  | Cement | | |
|---|---|---|---|
|  | R | S | T |
|  | | Grinding aid | |
| % wt | DIEG | Na2SO4 + THEED liquid | Na2SO4 + THEED solid |
| SO3 | 2.8 | 3.01 | 3.01 |
| Na2O | 0.23 | 0.39 | 0.39 |
| K2O | 0.35 | 0.34 | 0.34 |
| TiO2 | 0.25 | 0.25 | 0.25 |
| P2O5 | 0.2 | 0.2 | 0.2 |
| Mn2O3 | 0.03 | 0.03 | 0.03 |
| SrO | 0.07 | 0.07 | 0.07 |
| Cr2O3 | 0.02 | 0.02 | 0.02 |
| ZnO | 0.04 | 0.04 | 0.04 |
| LOI | 0.71 | 0.71 | 0.7 |

Second cement (sample "S") was composed of 0.69 g of THEED in a liquid form and 6.90 g of $Na_2SO_4$ as a powder were added to 3325 g of clinker and 133 g of hemihydrate to obtain a 0.02% of THEED and 0.4% of $Na_2SO_4$. These ingredients were ground for 2 hours in the same laboratory ball mill at 116° C. to produce cement for testing.

In the case of the third sample (sample "T"), 0.69 g of THEED was mixed with 6.90 g of $Na_2SO_4$ to obtain a solid mixture. The THEED+$Na_2SO_4$ mixture was added to 3325 g of clinker and 133 g of hemihydrate. The ingredients were mixed for 2 hours in the same laboratory ball mill at 116° C. to produce cement for testing.

The fineness of the three cements obtained from grinding was measured by air permeability method (Blaine method ($cm^2$/g)), by Alpine Sieve method (% amount of particle passing the sieve of 45 um) and by laser diffraction (particle size distribution). The results of the Blaine and Alpine assessments are presented in the Table 4, whereas the results of laser diffraction experiments are graphically presented in FIG. 11.

Figure 11:
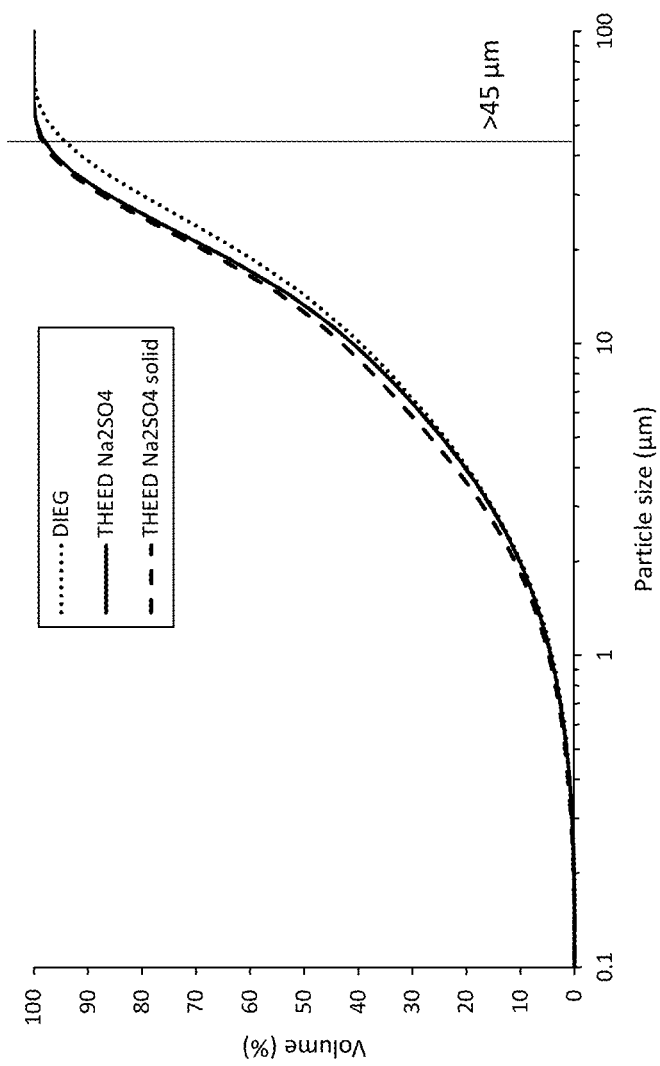
FIG. 11 is a plot of "volume fraction" of the particles in a ground cement sample as a function of particle size in micrometers. The curves are labeled to indicate cement compositions ground with the addition of the indicated grinding aid. See Example 7 for details.

It has been found by all three particle characterization methods that the particle size of samples containing THEED+$Na_2SO_4$ is finer than the particle size of samples prepared with DIEG. This indicates that using THEED+$Na_2SO_4$ reduce the grinding time and so save energy to deliver similar fineness of cement than using DIEG. Adding THEED+$Na_2SO_4$ as two separate components or as a mixture of both does not significantly change the Blaine and the alpine results. Results from laser diffraction shown in FIG. 11, show a more detailed picture of the particle size distribution. Addition of THEED+$Na_2SO_4$, either as a solid mixture or as two separate compounds, results in an unexpectedly lower average particle size when compared to the samples ground in the presence of DIEG. This indicates a better efficiency of the THEED/$Na_2SO_4$ mixture as a grinding additive over DIEG.

TABLE 4

| Blaine and Alpine analysis | | |
|---|---|---|
|  | Blaine ($cm^2$/g) | Alpine (% passing 45 um sieve) |
| Cement R: DIEG | 3341 | 92.76 |
| Cement S: THEED $Na_2SO_4$ liquid | 3257 | 98.12 |
| Cement T: THEED $Na_2SO_4$ solid | 3321 | 98.02 |

Example 7: Strength Enhancement from Ground Cement with THEED+$Na_2SO_4$

Four sample mortars were prepared using the EN196 protocol described above. Samples 1 and 2 were prepared using the cement R ground in the presence of diethylene glycol (DIEG) alone (at 0.02% by weight of the cementitious material) from Example 6 Sample 3 was prepared using the cement S ground with THEED+sodium sulfate combination from Example 6, where THEED (liquid) and sodium sulfate (solid) were added separately. Sample 4 was prepared using the cement T ground with the mixture comprising both THEED and sodium sulfate used in Example 6.

EN196 mortars, as described above and their compressive strength at Day 1 and Day 3 were measured. The Day 1 strength values confirm the enhancement of strength due to adding THEED+$Na_2SO_4$ combination, as an admixture after grinding (sample 2) and as grinding aid (sample 3 and 4). The results also showed that the enhancement effect of the Day 1 strength when THEED+$Na_2SO_4$ combination was unexpectedly 10% higher than when the combination was used as an additive after grinding.

TABLE 5

| Particle Size and Compressive Strength of Mortars Prepared Using Grinding Aids/Strength Enhancing Agents | | | | | | |
|---|---|---|---|---|---|---|
|  |  | 1 day Strength | | | 3 days Strength | |
|  |  | MPa | % over blank | Delta MPa | MPa | % over blank | Delta MPa |
| 1 | Cement R with DIEG | 13.43 | — | — | 27.55 | — | — |
| 2 | Cement R with DIEG + (THEED $Na_2SO_4$) admixed | 14.42 | 107% | 0.98 | 30.33 | 110% | 2.78 |
| 3 | Cement S THEED $Na_2SO_4$ | 15.87 | 118% | 2.43 | 30.63 | 111% | 3.08 |
| 4 | Cement T THEED $Na_2SO_4$ solid | 15.83 | 118% | 2.4 | 32.9 | 119% | 5.35 |

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming a cement composition, comprising:
   adding to a hydraulic cementitious material a first strength-enhancing agent and a second strength-enhancing agent,
   wherein:
   the content of total alkali ($Na_2O$ equivalent) in the hydraulic cementitious material is 0.12 to 0.7% by weight of the cementitious material;
   the first strength-enhancing agent includes a compound represented by structural formula (I):

wherein:
each $R^1$, $R^2$, $R^3$, and $R^4$, independently is a —($C_1$-$C_4$) alkyl-OH, and $R^0$ is a ($C_1$-$C_4$) alkylene; and
the first strength-enhancing agent is added in an amount of from 0.0005% to 0.20% by weight of the hydraulic cementitious material;
the first strength-enhancing agent includes tetrahydroxyethylethylenediamine (THEED);
the second strength-enhancing agent is sodium sulfate; and
the second strength-enhancing agent is added in an amount of 0.05-0.30 percent $Na_2O$ equivalent by weight of the hydraulic cementitious material.

2. The method of claim 1, wherein the second strength-enhancing agent is added in an amount of 0.15-0.30 percent $Na_2O$ equivalent by weight of the hydraulic cementitious material.

3. The method of claim 1, wherein the second strength-enhancing agent is added in an amount of 0.17-0.25 percent $Na_2O$ equivalent by weight of the hydraulic cementitious material.

4. The method of claim 1, wherein the first strength-enhancing agent is added in an amount of 0.0005% to 0.04% by weight of the hydraulic cementitious material.

5. The method of claim 1, wherein each of $R^1$, $R^2$, $R^3$, and $R^4$ independently is a —($C_2$-$C_3$)alkyl-OH, and $R^0$ is a ($C_2$-$C_3$)alkylene.

6. The method of claim 1, further comprising adding to the hydraulic cementitious material at least one defoaming agent.

7. The method of claim 1, further comprising adding to the hydraulic cementitious material one or more of defoaming agents chosen from:
a triisobutylphosphate;
an ethoxylated, propoxylated fatty alcohol represented by the following structural formula:

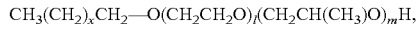

an ethoxylated, propoxylated alkylphenol represented by the following structural formula:

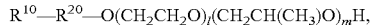

wherein:
x represents an integer from 2 to 18; l and m, for each occurrence independently, is an integer from 3 to 15; $R^{10}$ is a C4-C12 alkyl; and $R^{20}$ is a phenyl group; or
a polyalkoxylated polyalkylene polyamine represented by the following structural formula:

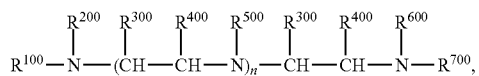

or salt thereof, wherein:
each of $R^{100}$, $R^{200}$, $R^{300}$, $R^{400}$, $R^{500}$, $R^{600}$, and $R^{700}$ independently represents a hydrogen, $C_1$-$C_4$ alkyl group, —$CH_2$—OH, or -(AO)$_y$—$R^8$, wherein at least one of $R^{100}$, $R^{200}$, $R^{300}$, $R^{400}$, $R^{500}$, $R^{600}$, and $R^{700}$ is -(AO)$_y$—$R^8$, and wherein AO represents propylene oxide ("PO") or a mixture of PO and ethylene oxide ("EO"), wherein the molar ratio of PO to EO is at least 100:0 to 100:90; y is an integer from 4 to 100; $R^8$ is hydrogen or a C1-C12 alkyl group; and n is 0 or an integer from 1 to 100.

8. The method of claim 1, further comprising adding to the hydraulic cementitious material a viscosity modifying agent for stabilizing the defoaming agent.

9. The method of claim 1, further wherein the first strength-enhancing agent further includes one or more of triisopropanolamine (TIPA), triethanolamine (TEA), diethanolisopropanolamine (DEIPA), or ethanol diisopropanolamine (EDIPA).

10. The method of claim 1, wherein:
the content of total alkali ($Na_2O$ equivalent) in the hydraulic cementitious material is less than or equal to 0.7% by weight of the cementitious material;
the first strength-enhancing agent comprising tetrahydroxyethylethylenediamine (THEED) is added in an amount of from 0.001% to 0.02% by weight of the cementitious material; and
the second strength-enhancing agent is added in an amount of from 0.17 to 0.25% $Na_2O$ equivalent by weight of the hydraulic cementitious material.

11. The method of claim 1, further comprising adding to the hydraulic cementitious material at least one additional component chosen from a grinding aid, a set retarding agent, or a set accelerating agent.

12. The method of claim 1, wherein the hydraulic cementitious material comprises Portland cement or cement clinker, and, optionally, further includes one or more of fly ash, granulated blast furnace slag, limestone, natural pozzolan, or calcined clay.

13. The method of claim 1, further including mixing the first and the second strength-enhancing agent prior to adding said first or second strength-enhancing agent to the hydraulic cementitious material, thereby forming a mixture of the strength-enhancing agents.

14. The method of claim 13, wherein the weight ratio of the first strength enhancing agent to the second strength enhancing agent in the mixture of the strength-enhancing agents is from 1:600 to 10:1.

15. The method of claim 13, wherein the weight ratio of the first strength enhancing agent to the second strength enhancing agent mixture of the strength-enhancing agents is from 1:250 to 1:8.5.

16. The method of claim 1, wherein the first strength-enhancing agent is a liquid and the second strength-enhancing agent is a powder, said powder optionally mixed with one or more of gypsum, fly ash, blast furnace slag, limestone, natural pozzolan, or calcined clay.

17. The method of claim 16, wherein the first strength-enhancing agent further includes one or more of:
a grinding aid, wherein the weight ratio of the grinding aid to the compound of structural formula (I) is from 60:1 to 1:20;
a set retarding agent, wherein the weight ratio of the set retarding agent to the compound of structural formula (I) is from 60:1 to 1:20;
a set accelerating agent, wherein the weight ratio of the set accelerating agent to the compound of structural formula (I) is from 200:1 to 1:20; or
a defoamer, wherein the weight ratio of the defoamer to the compound of structural formula (I) is from 1.6:1 to 1:50.

18. The method of claim 1, further comprising: adding to the hydraulic cementitious material one or more of a cement dispersant, a superplasticizer or a water-reducer.

19. A cement composition provided by the method of claim 1.

20. An admixture composition for manufacturing cementitious compositions, comprising:

a first strength-enhancing agent and a second strength-enhancing agent, wherein:

the first strength-enhancing agent includes a compound represented by structural formula (I):

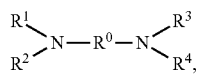

(I)

wherein:

each $R^1$, $R^2$, $R^3$, and $R^4$, independently is a $-(C_1\text{-}C_4)$ alkyl-OH, and $R^0$ is a $(C_1\text{-}C_4)$ alkylene; and the first strength-enhancing agent being present in the amount of 0.1 to 80% by dry weight solids of the admixture composition;

the first strength-enhancing agent includes tetrahydroxyethylethylenediamine (THEED) and at least one or more of diethanolisopropanolamine (DEIPA) or ethanol diisopropanolamine (EDIPA);

the second strength-enhancing agent is sodium sulfate; and the second strength-enhancing agent is present in an amount of 20% to 99.9% $Na_2O$ equivalent by dry weight solid of the admixture composition.

21. The admixture composition of claim 20, wherein each of $R^1$, $R^2$, $R^3$, and $R^4$ independently is a $-(C_2\text{-}C_3)$alkyl-OH, and $R^0$ is a $(C_2\text{-}C_3)$alkylene.

22. The admixture composition of claim 20, further comprising at least one defoaming agent.

23. The admixture composition of claim 20, further comprising one or more of defoaming agents chosen from:

a triisobutylphosphate;

an ethoxylated, propoxylated fatty alcohol represented by the following structural formula:

$CH_3(CH_2)_xCH_2-O(CH_2CH_2O)_l(CH_2CH(CH_3)O)_mH$;

an ethoxylated, propoxylated alkylphenol represented by the following structural formula:

$R^{10}-R^{20}-O(CH_2CH_2O)_l(CH_2CH(CH_3)O)_mH$, wherein:

x represents an integer from 2 to 18; l and m, for each occurrence independently, is an integer from 3 to 15; $R^{10}$ is a C4-C12 alkyl; and $R^{20}$ is a phenyl group; or a polyalkoxylated polyalkylene polyamine represented by the following structural formula:

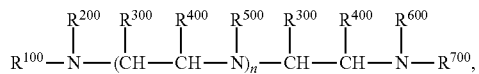

or salt thereof, wherein:

each of $R^{100}$, $R^{200}$, $R^{300}$, $R^{400}$, $R^{500}$, $R^{600}$, and $R^{700}$ independently represents a hydrogen, $C_1\text{-}C_4$ alkyl group, $-CH_2-OH$, or $-(AO)_y-R^8$, wherein at least one of $R^{100}$, $R^{200}$, $R^{300}$, $R^{400}$, $R^{500}$, $R^{600}$, and $R^{700}$ is $-(AO)_y-R^8$, and wherein AO represents propylene oxide ("PO") or a mixture of PO and ethylene oxide ("EO"), wherein the molar ratio of PO to EO is at least 100:0 to 100:90; y is an integer from 4 to 100; $R^8$ is hydrogen or a C1-C12 alkyl group; and n is 0 or an integer from 1 to 100.

24. The admixture composition of claim 20, further comprising a viscosity modifying agent for stabilizing the defoaming agent.

25. The admixture composition of claim 20, wherein the first strength-enhancing agent further includes one or more of triisopropanolamine (TIPA) or triethanolamine (TEA).

26. The admixture composition of claim 20, further comprising at least one additional component chosen from a grinding aid, a set retarding agent, or a set accelerating agent.

27. A method of forming a cement composition, comprising:

adding to a hydraulic cementitious material a first strength-enhancing agent and a second strength-enhancing agent, wherein:

the content of total alkali ($Na_2O$ equivalent) in the hydraulic cementitious material is 0.12 to 0.7% by weight of the cementitious material;

the first strength-enhancing agent includes a compound represented by structural formula (I):

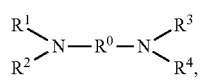

(I)

wherein:

each $R^1$, $R^2$, $R^3$, and $R^4$, independently is a $-(C_1\text{-}C_4)$ alkyl-OH, and $R^0$ is a $(C_1\text{-}C_4)$ alkylene; and the first strength-enhancing agent is added in an amount of from 0.0005% to 0.20% by weight of the hydraulic cementitious material;

the first strength-enhancing agent includes tetrahydroxyethylethylenediamine (THEED) and at least one or more of diethanolisopropanolamine (DEIPA) or ethanol diisopropanolamine (EDIPA);

the second strength-enhancing agent is sodium sulfate; and the second strength-enhancing agent is added in an amount of 0.05-0.30 percent $Na_2O$ equivalent by weight of the hydraulic cementitious material.

* * * * *